(12) United States Patent
Goto et al.

(10) Patent No.: US 12,091,047 B2
(45) Date of Patent: Sep. 17, 2024

(54) DRIVING ASSISTANCE METHOD AND DRIVING ASSISTANCE DEVICE

(71) Applicants: Nissan Motor Co., Ltd., Yokohama (JP); Renault S.A.S., Boulogne-Billancourt (FR)

(72) Inventors: Akinobu Goto, Kanagawa (JP); Takashi Fukushige, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 238 days.

(21) Appl. No.: 17/916,961

(22) PCT Filed: Apr. 6, 2020

(86) PCT No.: PCT/IB2020/000325
§ 371 (c)(1),
(2) Date: Oct. 4, 2022

(87) PCT Pub. No.: WO2021/205191
PCT Pub. Date: Oct. 14, 2021

(65) Prior Publication Data
US 2023/0166763 A1 Jun. 1, 2023

(51) Int. Cl.
*B60W 60/00* (2020.01)
*B60W 30/095* (2012.01)
(Continued)

(52) U.S. Cl.
CPC .... *B60W 60/0011* (2020.02); *B60W 30/0956* (2013.01); *B60W 30/143* (2013.01);
(Continued)

(58) Field of Classification Search
CPC ......... B60W 60/0011; B60W 30/0956; B60W 30/143; B60W 40/076; B60W 50/0098;
(Continued)

(56) References Cited

U.S. PATENT DOCUMENTS 9,604,638 B2 3/2017 Kiyokawa et al.
2016/0075328 A1 3/2016 Seiki
(Continued)

FOREIGN PATENT DOCUMENTS

JP 2014-101101 A 6/2014
JP 2016-060240 A 4/2016
(Continued)

*Primary Examiner* — Sze-Hon Kong
(74) *Attorney, Agent, or Firm* — Young Basile Hanlon & MacFarlane, P.C.

(57) ABSTRACT

A driving assistance method for controlling an own vehicle by a controller in such a way that the own vehicle travels along a target travel trajectory includes: acquiring level-difference information of a level difference existing along a lane in which the own vehicle travels; and when, from the level-difference information, determining that the own vehicle is to climb over the level difference, generating the target travel trajectory in such a way that a level-difference climbing-over angle, which is an angle formed by the level difference and the target travel trajectory, is larger than a threshold value.

13 Claims, 9 Drawing Sheets

(51) Int. Cl.
    *B60W 30/14* (2006.01)
    *B60W 40/076* (2012.01)
    *B60W 50/00* (2006.01)

(52) U.S. Cl.
    CPC ...... *B60W 40/076* (2013.01); *B60W 50/0098* (2013.01); *B60W 2050/0083* (2013.01); *B60W 2530/20* (2013.01); *B60W 2552/15* (2020.02); *B60W 2552/53* (2020.02)

(58) Field of Classification Search
    CPC ..... B60W 2050/0083; B60W 2530/20; B60W 2552/15; B60W 2552/53; B60W 10/20; B60W 2720/10; B60W 30/18145; B60W 60/0027; B60W 2554/20; B60W 2554/60; B60W 2554/805; B60W 2556/40; B60W 2556/50; B60W 2710/207; B60W 60/001
    See application file for complete search history.

(56) References Cited

U.S. PATENT DOCUMENTS

| | | | | |
|---|---|---|---|---|
| 2018/0330173 | A1* | 11/2018 | Zhu | B60W 10/06 |
| 2019/0225218 | A1* | 7/2019 | Ishikawa | B60W 40/06 |
| 2020/0216085 | A1* | 7/2020 | Bobier-Tiu | B60W 40/08 |
| 2022/0204034 | A1* | 6/2022 | Stein | B60W 30/095 |

FOREIGN PATENT DOCUMENTS

| | | |
|---|---|---|
| JP | 2017-102638 A | 6/2017 |
| JP | 2019-144030 A | 8/2019 |
| JP | 2020-040515 A | 3/2020 |
| WO | 2018/193577 A1 | 10/2018 |

* cited by examiner

DRIVING ASSISTANCE METHOD AND DRIVING ASSISTANCE DEVICE

TECHNICAL FIELD

The present invention relates to a driving assistance method and a driving assistance device.

BACKGROUND

In JP 2019-144030 A, a map data storage unit in which level-difference information relating to a level difference at an entrance to a facility that, when entering the facility from a road, a vehicle is required to pass and facility information relating to the facility are stored in association with each other is described. It is described that, to a vehicle that is to enter the facility, stored information of the position of the level difference is provided in conjunction with ground object information.

SUMMARY

When, at the time of a vehicle climbing over a level difference, the traveling direction of the vehicle is inclined with respect to the extending direction of the level difference, disturbance is applied to the steered wheels of the vehicle and a deviation occurs to the traveling direction of the vehicle. Therefore, when, in the self-driving control, the vehicle is caused to self-travel along a preset target travel trajectory, a deviation from the target travel trajectory occurs.

An object of the present invention is to, in driving assistance to control an own vehicle in such a way that the own vehicle travels along a target travel trajectory, reduce deviation from the target travel trajectory when the own vehicle climbs over a level difference.

According to an aspect of the present invention, there is provided a driving assistance method for controlling an own vehicle by a controller in such a way that the own vehicle travels along a target travel trajectory, the method including: acquiring level-difference information of a level difference existing along a lane in which the own vehicle travels; and when, from the level-difference information, determining that the own vehicle is to climb over the level difference, generating the target travel trajectory in such a way that a level-difference climbing-over angle, which is an angle formed by the level difference and the target travel trajectory, is larger than a threshold value.

According to an aspect of the present invention, it is possible to, in driving assistance to control an own vehicle in such a way that the own vehicle travels along a target travel trajectory, reduce deviation from the target travel trajectory when the own vehicle climbs over a level difference.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

First Embodiment (Configuration)

Figure 1:
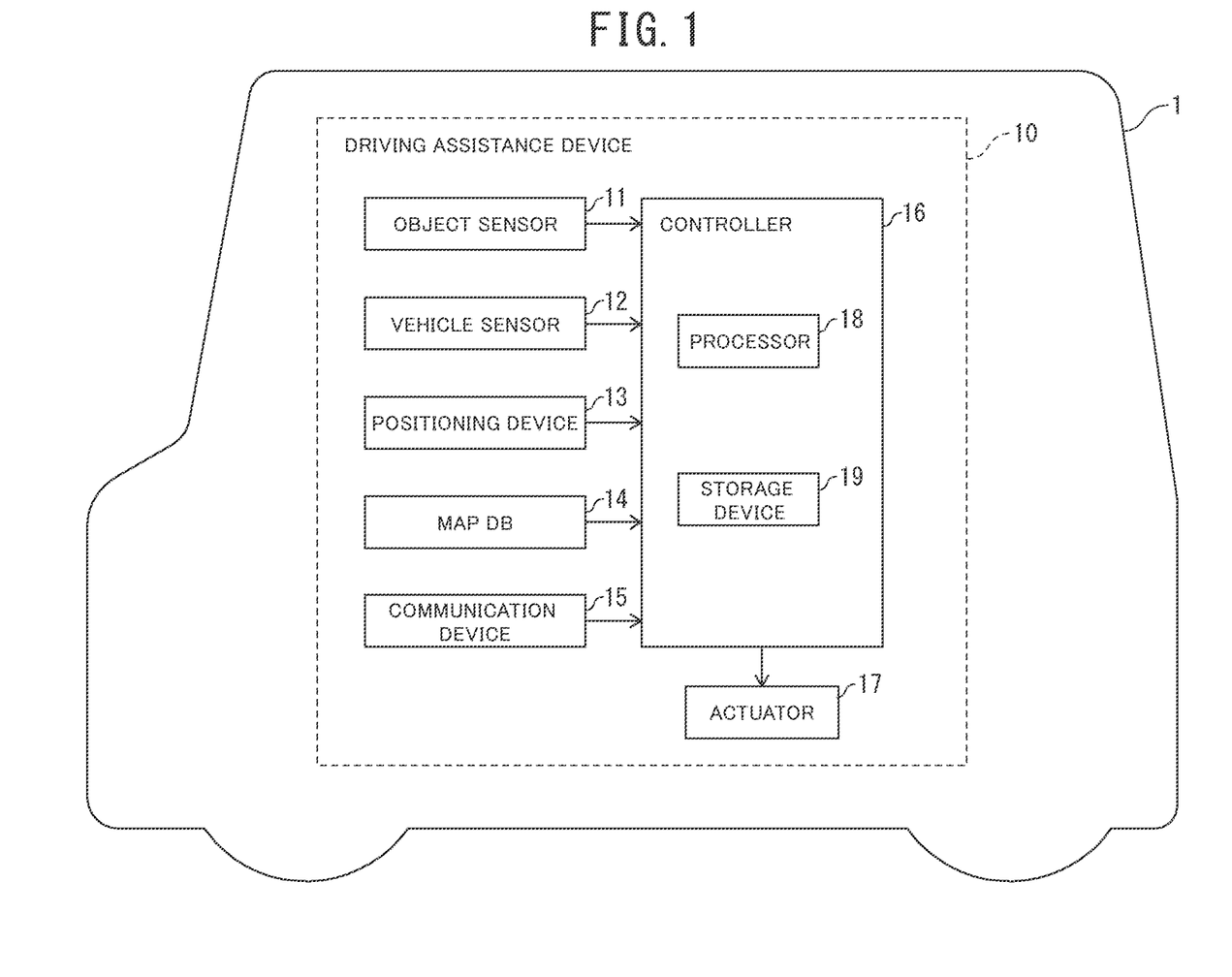
FIG. 1 is a schematic configuration diagram of a driving assistance device of embodiments.

FIG. 1 is now referred to. An own vehicle 1 includes a driving assistance device 10 configured to perform driving assistance of the own vehicle 1. The driving assistance performed by the driving assistance device 10 may include self-driving control that, based on, for example, a travel environment around the own vehicle 1, causes the own vehicle 1 to self-drive without involvement of a driver.

An example of the self-driving control by the driving assistance device 10 may be driving control that causes the own vehicle 1 to self-travel along a preset target travel trajectory in an urban area.

The driving assistance device 10 includes object sensors 11, vehicle sensors 12, a positioning device 13, a map database 14, a communication device 15, a controller 16, and actuators 17. In the drawings, the map database is denoted as "map DB".

The object sensors 11 include a plurality of object detection sensors of different types that are mounted on the own vehicle 1 and detect objects around the own vehicle 1, such as a laser radar, a millimeter-wave radar, a camera, and a light detection and ranging or laser imaging detection and ranging (LIDAR).

The vehicle sensors 12 are mounted on the own vehicle 1 and detect various information (vehicle signals) that can be acquired from the own vehicle 1. The vehicle sensors 12 include a vehicle speed sensor to detect traveling speed (vehicle speed) of the own vehicle 1, wheel speed sensors to detect rotational speeds of respective tires that the own vehicle 1 includes, a triaxial acceleration sensor (G sensor) to detect acceleration (including deceleration) of the own vehicle 1 in three axial directions, a steering angle sensor to detect a steering angle (including a turning angle), a gyro sensor to detect angular velocity generated in the own vehicle 1, a yaw rate sensor to detect a yaw rate, an accelerator sensor to detect accelerator opening of the own vehicle, and a brake sensor to detect a brake operation amount by the driver.

The positioning device 13 includes a global navigation satellite system (GNSS) receiver and, by receiving radio waves from a plurality of navigation satellites, measures a current position of the own vehicle 1. The GNSS receiver may be, for example, a global positioning system (GPS) receiver or the like. The positioning device 13 may be, for example, an inertial navigation device.

The map database 14 may store high-definition map data (hereinafter, simply referred to as "high-definition map"), which is suitable as a map for self-driving. The high-definition map is map data of higher precision than map data for navigation (hereinafter, simply referred to as "navigation map") and includes information in units of lanes, which is more detailed than information in units of roads.

For example, the high-definition map includes, as information in units of lanes, information of lane nodes that indicate reference points on a lane reference line (for example, a line at the center of a lane) and information of lane links that indicate forms of lane sections between lane nodes.

Information of each lane node includes an identification number and position coordinates of the lane node, the number of connected lane links, and identification numbers of connected lane links. Information of each lane link includes an identification number of the lane link, the type of the lane, width of the lane, the types of lane boundary lines, a shape of the lane, a shape of a lane marking, and a shape of the lane reference line. The high-definition map further includes the types and position coordinates of ground objects, such as a traffic light, a stop line, a road sign, a building, a utility pole, a curb, and a crosswalk, that exist on a lane or in the vicinity of the lane and information of the ground objects, such as identification numbers of lane nodes and identification numbers of lane links that correspond to the position coordinates of the ground objects Since the high-definition map includes node information and link information in units of lanes, it is possible to specify a lane in which the own vehicle 1 travels in a travel route. The high-definition map has a coordinate system that can represent positions in the extending direction and width direction of each lane. The high-definition map has coordinates (for example, longitude, latitude, and altitude) that can represent positions in the three-dimensional space, and lanes and the above-described ground objects may be described as shapes in the three-dimensional space.

The communication device 15 performs wireless communication with a communication device external to the own vehicle 1. A communication method used by the communication device 15 may be, for example, wireless communication via a public mobile telephone network, vehicle-to-vehicle communication, road-to-vehicle communication, or satellite communication.

The controller 16 is an electronic control unit (ECU) that performs driving assistance control of the own vehicle 1. The controller 16 includes a processor 18 and peripheral components, such as a storage device 19. The processor 18 may be, for example, a central processing unit (CPU) or a micro-processing unit (MPU).

The storage device 19 may include a semiconductor storage device, a magnetic storage device, an optical storage device, and the like. The storage device 19 may include, registers, a cache memory, and a memory used as a main storage device, such as a read only memory (ROM) and a random access memory (RAM).

Functions of the controller 16, which will be described below, may be achieved by, for example, the processor 18 executing computer programs stored in the storage device 19.

Note that the controller 16 may be formed by dedicated hardware for executing information processing that will be described below.

For example, the controller 16 may include a functional logic circuit that is implemented in a general-purpose semiconductor integrated circuit. For example, the controller 16 may include a programmable logic device, such as a field-programmable gate array (FPGA), and the like.

The actuators 17 operate a steering wheel, accelerator opening, and a braking device of the own vehicle in accordance with control signals output from the controller 16 and thereby generate vehicle behavior of the own vehicle. The actuators 17 include a steering actuator, an accelerator opening actuator, and brake control actuators. The steering actuator controls steering direction and the amount of steering of steering of the own vehicle.

The accelerator opening actuator controls the accelerator opening of the own vehicle. The brake control actuators control braking action of the braking devices of the own vehicle 1.

Figure 2A:
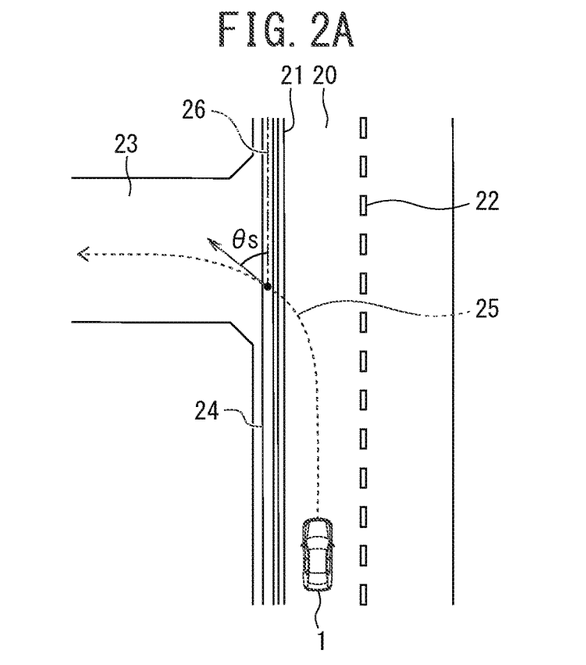
FIG. 2A is an explanatory diagram of an example of a driving assistance method of the embodiments.
Figure 2B:
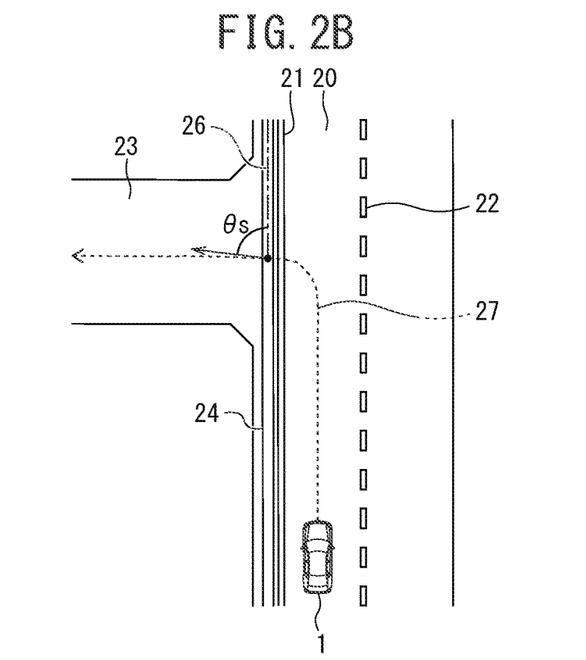
FIG. 2B is another explanatory diagram of the example of the driving assistance method of the embodiments.

Next, an example of the driving assistance control executed by the controller 16 will be described. FIGS. 2A and 2B are now referred to. The reference sign 20 indicates a lane in which the own vehicle 1 travels, and the reference signs 21 and 22 indicate demareation lines indicating boundaries of the lane 20. In the example in the description of the present invention, the demareation line 21 is a lane outside line of the lane 20, and the demareation line 22 is a lane boundary line. The demareation lines 21 and 22 are examples of a "travelling path boundaries" described in the claims. The travelling path boundary is not limited to a demareation line and may be a ground object, such as a curb and a guardrail, or a road shoulder.

A passage 23 is connected to the lateral side of the lane 20 so as to face the lane 20, and between the lane 20 and the passage 23, a level difference 24 extends in parallel with the lane 20. The passage 23 may be, for example, a passage for entering a facility or a private property. The passage 23 does not have to be a distinctively formed passage and may be, for example, a portion of a walkway existing between an entrance to a facility or a private property and the lane 20.

A case is now assumed where the controller 16, which executes the self-driving control, generates a target travel trajectory 25 that, as illustrated in FIG. 2A, deviates from the lane 20 and enters the passage 23. The own vehicle 1, which is traveling along the target travel trajectory 25, climbs over the level difference 24 and enters the passage 23.

An angle $\theta s$ formed by a traveling direction of the own vehicle 1 and an extending direction of the level difference 24 at the time of the own vehicle 1 climbing over the level difference 24 is determined by an angle formed by a straight line parallel with the level difference 24 and the target travel trajectory 25, that is, an angle formed by the intersection of the level difference 24 and the target travel trajectory 25. Hereinafter, an angle $\theta s$ formed by the intersection of the level difference 24 and the target travel trajectory 25 is referred to as a "level-difference climbing-over angle".

When the level-difference climbing-over angle $\theta s$ is less than 90 degrees, that is, when the traveling direction of the own vehicle 1 is inclined with respect to the extending direction of the level difference 24, disturbance about a steered shaft is applied to steered wheels of the own vehicle 1, which climbs over the level difference 24. In the description of the present invention, the steered wheels mean wheels steered by a steering mechanism.

The disturbance becomes larger as the level-difference climbing-over angle θs is further away from 90 degrees. When large disturbance is applied to the steered wheels, there is a possibility that an actual steered angle deviates from a target steered angle that is set according to the target travel trajectory 25, the own vehicle 1 departs from the target travel trajectory 25, and the own vehicle 1 is likely to come close to an obstacle around the own vehicle 1.

Accordingly, when generating a target travel trajectory that climbs over the level difference 24, the controller 16 generates a target travel trajectory in such a way that the level-difference climbing-over angle θs is larger than a predetermined threshold value Th.

In FIG. 2B, an example of a target travel trajectory 27 generated in such a way that the level-difference climbing-over angle θs is larger than the predetermined threshold value Th is illustrated. Generating a target travel trajectory 27 in such a way that the level-difference climbing-over angle θs is larger than the predetermined threshold value Th enables the own vehicle 1 to climb over the level difference 24 at an angle close to 90 degrees.

Because of this configuration, it is possible to reduce disturbance about the steered shaft applied to the steered wheels at the time of climbing over the level difference 24 and departure from the target travel trajectory 27 to be reduced. As a result, it is possible to prevent a close approach to an obstacle due to departure from the target travel trajectory 27.

Note that, although, in the description of the present invention, a case where the level difference 24 exists between the lane 20 and the passage 23 is described, the present invention is not limited thereto. The present invention is widely applicable to cases where, in the self-driving control, a target travel trajectory that climbs over a level difference 24 is generated.

Next, a functional configuration of the controller 16 will be described in detail with reference to FIG. 3. The controller 16 includes an object detection unit 30, an own-vehicle position estimation unit 31, a map acquisition unit 32, a detection integration unit 33, an object tracking unit 34, a position-in-map calculation unit 35, a driving action plan determination unit 36, a travelable region determination unit 37, a target travel trajectory generation unit 38, a level-difference determination unit 39, a level-difference climbing-over angle calculation unit 40, a regeneration determination unit 41, and a vehicle control unit 42.

The object detection unit 30 detects, based on detection signals from the object sensors 11, positions, attitudes, sizes, speeds, and the like of objects around the own vehicle 1, such as a vehicle, a motorcycle, a pedestrian, and an obstacle. The object detection unit 30 outputs detection results representing two-dimensional positions, attitudes, sizes, speeds, and the like of objects in, for example, a zenith view (also referred to as a plan view) in which the own vehicle 1 is viewed from the air.

The own-vehicle position estimation unit 31 measures, based on a measurement result by the positioning device 13 and odometry using detection results from the vehicle sensors 12, an absolute position of the own vehicle 1, that is, a position of the own vehicle 1 with respect to a predetermined reference point, attitude, and speed of the own vehicle 1.

The map acquisition unit 32 acquires map information indicating a structure of a road on which the own vehicle 1 is to travel, from the map database 14. The map acquisition unit 32 may acquire map information from an external map data server through the communication device 15.

The detection integration unit 33 integrates a plurality of detection results that the object detection unit 30 respectively acquired from a plurality of object detection sensors and outputs one detection result with respect to each of the respective objects.

Specifically, the detection integration unit 33 calculates, from behavior of objects respectively acquired from the object detection sensors, the most reasonable behavior of the objects that minimizes error, in consideration of error characteristics of the respective object detection sensors.

Specifically, by using a known sensor fusion technology, the detection integration unit 33 comprehensively evaluates detection results acquired by a plurality of types of sensors and acquires a more accurate detection result.

The object tracking unit 34 tracks objects detected by the object detection unit 30. Specifically, based on the detection results integrated by the detection integration unit 33, the object tracking unit 34 performs verification of identity (association) of objects between different times from behaviors of the objects output at different times and predicts, based on the association, behavior of the objects, such as speed.

The position-in-map calculation unit 35 estimates a position and an attitude of the own vehicle 1 on the map from the absolute position of the own vehicle 1, which was acquired by the own-vehicle position estimation unit 31, and the map information, which was acquired by the map acquisition unit 32.

The driving action plan determination unit 36 determines, based on detection results acquired by the detection integration unit 33 and the object tracking unit 34 and the position of the own vehicle 1 identified by the position-in-map calculation unit 35, a schematic driving action of the own vehicle 1 that the driving assistance device 10 is to executes.

Examples of the driving action that the driving action plan determination unit 36 determines include, for example, stopping of the own vehicle 1, temporary stopping, traveling speed, deceleration, acceleration, course change, right turn, left turn, traveling straight, lane change at a merging section or between a plurality of lanes, lane keeping, overtaking, response to an obstacle, and the like.

The driving action plan determination unit 36 generates, based on the position and attitude of the own vehicle 1 that the position-in-map calculation unit 35 estimated, the positions and attitudes of objects around the own vehicle 1, and the high-definition map, a route space map that represents existence or nonexistence of a route and an object around the own vehicle 1 and a risk map in which a degree of risk of a traveling field is quantified. The driving action plan determination unit 36 generates, based on the route space map and the risk map, a driving action plan of the own vehicle 1.

The travelable region determination unit 37 determines, based on a driving action plan determined by the driving action plan determination unit 36, motion characteristics of the own vehicle 1, and the route space map, a travelable region where the own vehicle 1 can be caused to travel.

The target travel trajectory generation unit 38 generates, based on a driving action determined by the driving action plan determination unit 36 and a travelable region determined by the travelable region determination unit 37, candidates of a travel trajectory along which and a speed profile in accordance with which the own vehicle 1 is caused to travel.

The target travel trajectory generation unit 38 evaluates future risks of the respective candidates, based on the risk map, selects an optimum travel trajectory and speed profile, and sets the selected travel trajectory and speed profile as a target travel trajectory along which and a target speed profile in accordance with which the own vehicle 1 is caused to travel, respectively.

FIG. 2A is now referred to. When a target travel trajectory that causes the own vehicle 1 to turn as the target travel trajectory 25 is generated, the target travel trajectory generation unit 38 gradually increases curvature of the target travel trajectory 25 to a maximum curvature and subsequently gradually decreases the curvature of the target travel trajectory 25.

For example, the target travel trajectory generation unit 38 generates the target travel trajectory 25 formed according to a clothoid curve or a spline curve. Note, however, that the target travel trajectory 25 is not limited to a curve that is calculated by a known calculation formula as described above. The target travel trajectory 25 is only required to be a curve the curvature of which gradually increases to a maximum curvature and subsequently gradually decreases.

The target travel trajectory generation unit 38 may determine a curvature change rate of a target travel trajectory with specific parameters. Parameters with which a curvature change rate of a target travel trajectory is determined are hereinafter referred to as "curvature relaxation parameters". An example of the curvature relaxation parameters is clothoid parameters of a clothoid curve. As the curvature relaxation parameters become larger, a target travel trajectory 25 the curvature of which changes more gently is generated. As the curvature relaxation parameters become smaller, a target travel trajectory 25 the curvature of which changes more steeply is generated.

Figure 3:
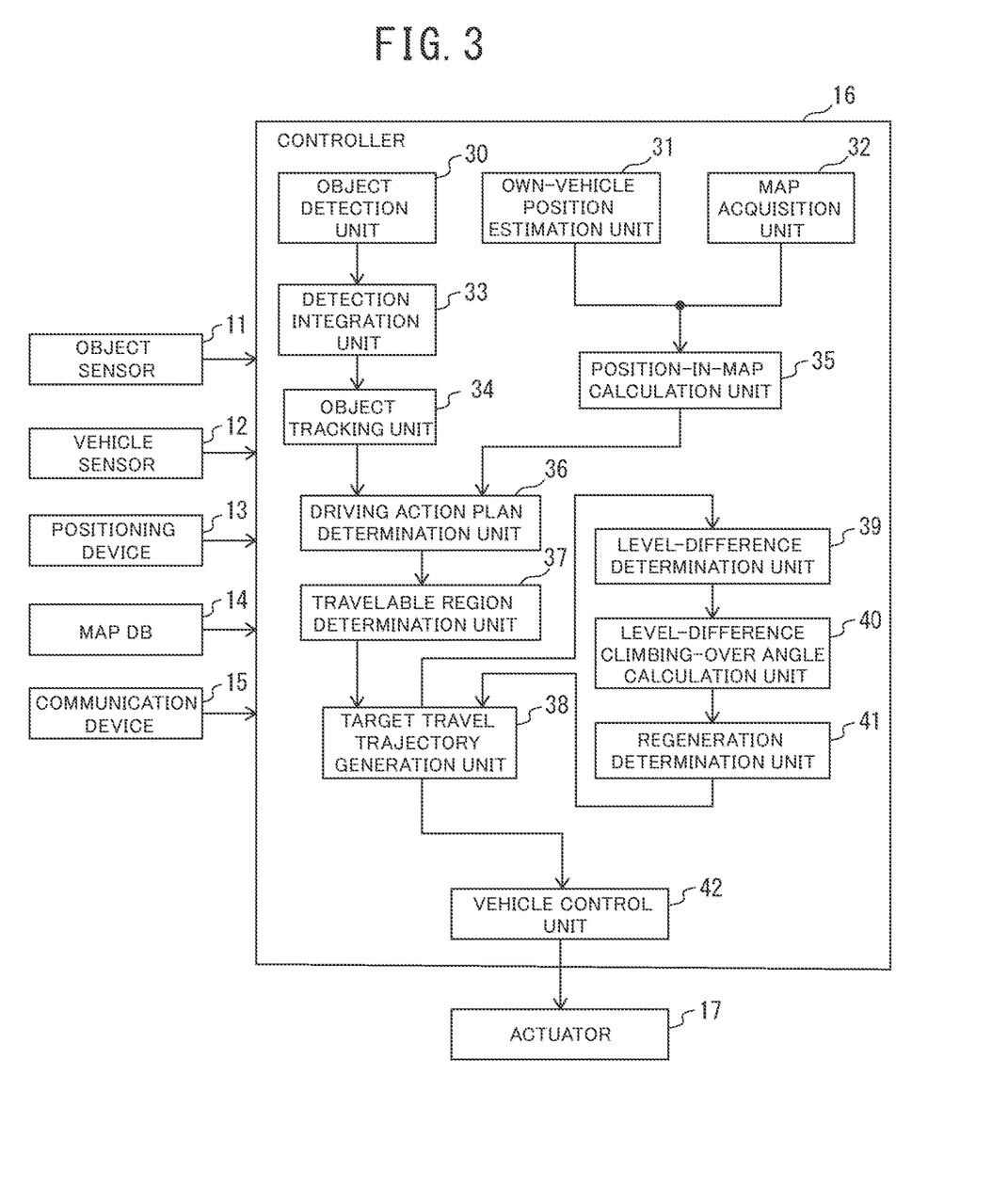
FIG. 3 is a block diagram illustrative of an example of a functional configuration of a driving assistance device of the embodiments.

FIG. 3 is now referred to. The level-difference determination unit 39 acquires level-difference information of the level difference 24, which exists in parallel with the lane 20. For example, the level-difference determination unit 39 may acquire level-difference information, based on an image recognition result of an image captured by a camera. In addition, the level-difference determination unit 39 may acquire level-difference information, based on detection results by the laser radar, the millimeter-wave radar, and the LIDAR.

The level-difference determination unit 39 may acquire, for example, the position, height, and inclination (an inclination angle of the upper surface of the level difference 24 with respect to the road surface of the lane 20 or the horizontal plane) of the level difference 24 as level-difference information.

In addition, for example, the level-difference determination unit 39 may, by detecting a boundary between a public road and a private property existing on the target travel trajectory 25, based on the map information in the map database 14, acquire level-difference information of the level difference 24 set in place at the boundary between the public road and the private property.

In addition, for example, the level-difference determination unit 39 may acquire, based on a travel history stored when the own vehicle 1 or another vehicle actually traveled, level-difference information of the level difference 24 existing on the target travel trajectory 25.

Figure 4:
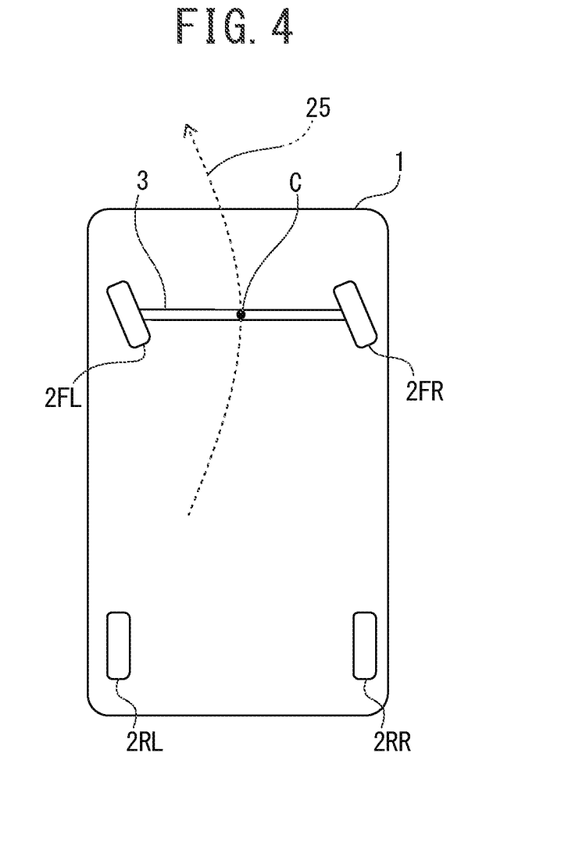
FIG. 4 is an explanatory diagram of a calculation example of a level-difference climbing-over angle $\theta s$.

The level-difference climbing-over angle calculation unit 40 determines whether or not the target travel trajectory 25 climbs over the level difference 24 (whether or not the target travel trajectory 25 intersects the level difference 24). The level-difference climbing-over angle calculation unit 40 calculates a level-difference climbing-over angle θs when the target travel trajectory 25 climbs over the level difference 24. FIG. 4 is now referred to. The reference signs 2FL and 2FR indicate the steered wheels of the own vehicle 1, and the reference signs 2RL and 2RR indicate the wheels other than the steered wheels. In the example in the description of the present invention, the steered wheels 2FL and 2FR are the left front wheel and the right front wheel, respectively, and the wheels 2RL and 2RR are the left rear wheel and the right rear wheel, respectively.

The level-difference climbing-over angle calculation unit 40, using a trajectory that a center position C of an axle 3 of the steered wheels 2FL and 2FR passes as the target travel trajectory 25, calculates a level-difference climbing-over angle θs formed by a straight line parallel with the level difference 24 and the target travel trajectory 25 (a level-difference climbing-over angle formed by the intersection of the level difference 24 and the target travel trajectory 25).

As described above, by calculating an angle formed by a trajectory that the center position C of the axle 3 of the steered wheels 2FL and 2FR passes and a straight line parallel with the level difference 24 as a level-difference climbing-over angle θs, it is possible to calculate an angle formed by the direction of the steered wheels 2FL and 2FR and the direction in which the level difference 24 extends more appropriately.

FIG. 3 is now referred to. The regeneration determination unit 41 determines whether or not to regenerate a target travel trajectory depending on the level-difference climbing-over angle θs calculated with respect to the target travel trajectory 25 that the target travel trajectory generation unit 38 generated.

When the level-difference climbing-over angle θs is less than or equal to the predetermined threshold value Th, the regeneration determination unit 41 determines to regenerate a target travel trajectory. When the level-difference climbing-over angle θs is greater than the predetermined threshold value Th, the regeneration determination unit 41 determines not to regenerate a target travel trajectory. The regeneration determination unit 41 outputs a determination result to the target travel trajectory generation unit 38.

Further, the regeneration determination unit 41 may dynamically change the threshold value Th. For example, the regeneration determination unit 41 may set a threshold value Th that changes according to level-difference information of the level difference 24. For example, the regeneration determination unit 41 may set a larger value as the threshold value Th as the level difference 24 is higher. For example, the regeneration determination unit 41 may set a larger value as the threshold value Th as the inclination of the level difference 24 is larger.

For example, the regeneration determination unit 41 may set a threshold value Th that changes according to an aspect ratio or outer diameter of the tires of the own vehicle 1. For example, the regeneration determination unit 41 may set a larger value as the threshold value Th as the aspect ratio of the tires is lower. For example, the regeneration determination unit 41 may set a larger value as the threshold value Th as the outer diameter of the tires is smaller.

In addition, the regeneration determination unit 41 may acquire obstacle information of obstacles around the own vehicle 1 from the object sensors 11. For example, in a situation illustrated in FIG. 5A, posts 40a and 40b, which are obstacles, exist.

Figure 5A:
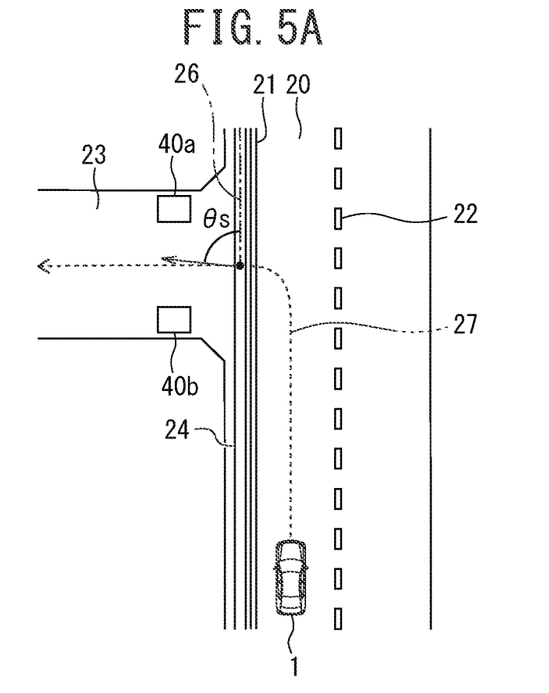
FIG. 5A is an explanatory diagram of an example of setting of a threshold value Th of the level-difference climbing-over angle $\theta s$.

When the obstacles 40a and 40b exist in the vicinity of the target travel trajectory 27 along which the own vehicle 1, after climbing over the level difference 24, is to travel, the regeneration determination unit 41 may set a larger value as the threshold value Th.

Figure 5B:
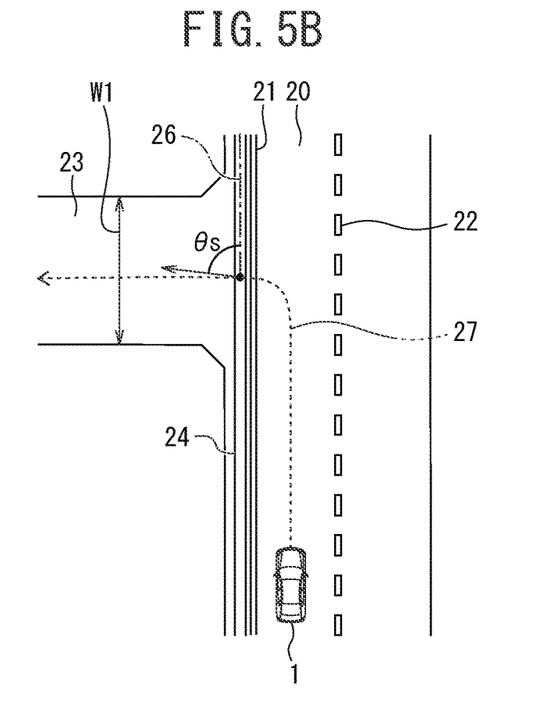
FIG. 5B is an explanatory diagram of another example of the setting of the threshold value Th of the level-difference climbing-over angle $\theta s$.

FIG. 5B is now referred to. The regeneration determination unit 41 may set a larger value as the threshold value Th as lane width W1 of the lane 23 in which the own vehicle 1, after climbing over the level difference 24, is to travel is narrower. Information of the lane width W1 may be acquired from, for example, the map database 14.

FIG. 3 is now referred to. When the regeneration determination unit 41 determines to regenerate a target travel trajectory, the target travel trajectory generation unit 38 regenerates a target travel trajectory.

When regenerating a target travel trajectory, the target travel trajectory generation unit 38 regenerates a target travel trajectory in such a way that the level-difference climbing-over angle θs of the regenerated target travel trajectory increases.

For example, the target travel trajectory generation unit 38, by reducing the curvature relaxation parameters of a target travel trajectory that causes the own vehicle 1 to turn toward the level difference 24, regenerates a target travel trajectory in such a way that the level-difference climbing-over angle θs increases.

On the other hand, when the regeneration determination unit 41 determines not to regenerate a target travel trajectory, the target travel trajectory generation unit 38 outputs the target travel trajectory and the target speed profile to the vehicle control unit 42.

Since, through this process, the target travel trajectory generation unit 38 repeats regeneration of a target travel trajectory until the level-difference climbing-over angle θs becomes larger than the threshold value Th, a target travel trajectory the level-difference climbing-over angle θs of which is larger than the threshold value Th is generated.

Further, the target travel trajectory generation unit 38 may set a target speed profile in such a way that target vehicle speed at a point of time when the own vehicle 1 passes the level difference 24 is less than or equal to a predetermined low speed (for example, 10 km/h).

In addition, the target travel trajectory generation unit 38 may dynamically change the target vehicle speed at a point of time when the own vehicle 1 passes the level difference 24.

For example, the target travel trajectory generation unit 38 may set a target speed profile in such a way that the target vehicle speed at a point of time when the own vehicle 1 passes the level difference 24 changes according to the level-difference information of the level difference 24.

For example, the target travel trajectory generation unit 38 may set lower the target speed at a point of time when the own vehicle 1 passes the level difference 24 as the level difference 24 is higher. For example, the target travel trajectory generation unit 38 may also set lower the target speed at a point of time when the own vehicle 1 passes the level difference 24 as the inclination of the level difference 24 is larger.

For example, the target travel trajectory generation unit 38 may set a target speed profile in such a way that the target vehicle speed at a point of time when the own vehicle 1 passes the level difference 24 changes according to the aspect ratio of the tires of the own vehicle 1 or the outer diameter of the tires. For example, the target travel trajectory generation unit 38 may set lower the target speed at a point of time when the own vehicle 1 passes the level difference 24 as the aspect ratio is lower. For example, the target travel trajectory generation unit 38 may also set lower the target speed at a point of time when the own vehicle 1 passes the level difference 24 as the outer diameter of the tires is smaller.

In addition, the target travel trajectory generation unit 38 may acquire obstacle information of obstacles around the own vehicle 1 from the object sensors 11.

FIG. 5A is now referred to. The target travel trajectory generation unit 38 may set a target speed profile in such a way that the target speed at a point of time when the own vehicle 1 passes the level difference 24 becomes lower when the obstacles 40a and 40b exist in the vicinity of the target travel trajectory 27 along which the own vehicle 1, after climbing over the level difference 24, is to travel.

FIG. 5B is now referred to. The target travel trajectory generation unit 38 may set a target speed profile in such a way that the target speed at a point of time when the own vehicle 1 passes the level difference 24 becomes lower as the lane width W1 of the lane 23 along which the own vehicle 1, after climbing over the level difference 24, is to travel is narrower.

In addition, the target travel trajectory generation unit 38 may set a target speed profile in such a way that the target vehicle speed at a point of time when the own vehicle 1 passes the level difference 24 changes according to the level-difference climbing-over angle θs.

For example, the target travel trajectory generation unit 38 may set lower the target speed at a point of time when the own vehicle 1 passes the level difference 24 as the level-difference climbing-over angle θs is smaller.

FIG. 3 is now referred to. The vehicle control unit 42 drives the actuators 17 in such a way that the own vehicle 1 travels along the target travel trajectory at a speed in accordance with the target speed profile output from the target travel trajectory generation unit 38.

(Operation)

Next, an example of operation of the driving assistance device 10 in the embodiment will be described with reference to FIG. 6.

In step S1, the object detection unit 30, using a plurality of object detection sensors, detects positions, attitudes, sizes, speeds, and the like of objects around the own vehicle 1.

In step S2, the detection integration unit 33 integrates a plurality of detection results acquired respectively from a plurality of object detection sensors and outputs one detection result with respect to each of the respective objects. The object tracking unit 34 tracks the respective objects that were detected and integrated and predicts behavior of the objects around the own vehicle 1.

In step S3, the own-vehicle position estimation unit 31 measures, based on a measurement result by the positioning device 13 and odometry using detection results from the vehicle sensors 12, the position, attitude, and speed of the own vehicle 1 with respect to a predetermined reference point.

In step S4, the map acquisition unit 32 acquires map information indicating a structure of a road on which the own vehicle 1 is to travel.

In step S5, the position-in-map calculation unit 35 estimates a position and attitude of the own vehicle 1 on the map from the position of the own vehicle 1 measured in step S3 and the map data acquired in step S4.

In step S6, the driving action plan determination unit 36 determines, based on detection results (behavior of objects around the own vehicle 1) acquired in step S2 and the position of the own vehicle 1 identified in step S5, a driving action of the own vehicle 1 that the driving assistance device 10 is to execute.

In step S7, the travelable region determination unit 37, the target travel trajectory generation unit 38, the level-difference determination unit 39, the level-difference climbing-over angle calculation unit 40, and the regeneration determination unit 41 execute trajectory generation processing for generating a target travel trajectory of the own vehicle 1.

Figure 7:
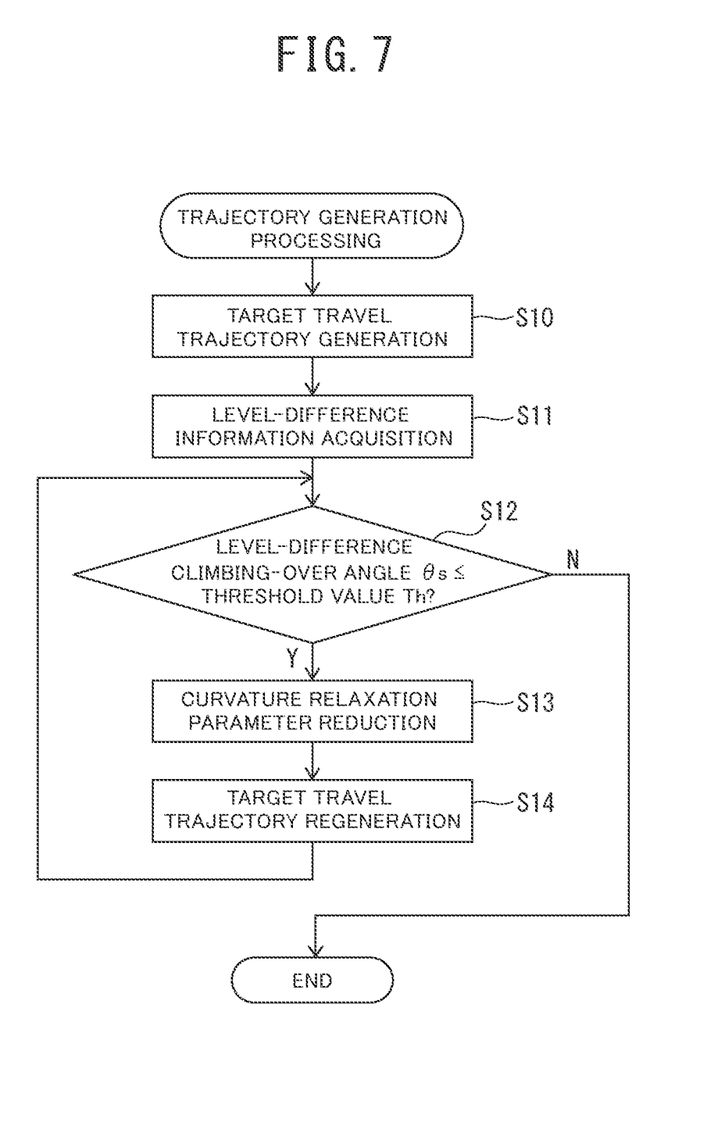
FIG. 7 is a flowchart of an example of trajectory generation processing of a first embodiment.

With reference to FIG. 7, the trajectory generation processing of the first embodiment will be described. In step S10, the travelable region determination unit 37 determines, in accordance with the driving action plan determined by the driving action plan determination unit 36 and based on motion characteristics of the own vehicle 1 and a route space map, a travelable region in which the own vehicle 1 can be caused to travel. The target travel trajectory generation unit 38 generates, based on the driving action determined by the driving action plan determination unit 36 and the travelable region determined by the travelable region determination unit 37, a target travel trajectory and a target speed profile.

In step S11, the level-difference determination unit 39 acquires level-difference information of a level difference 24, which exists in parallel with the lane 20.

In step S12, the level-difference climbing-over angle calculation unit 40 determines whether or not a target travel trajectory 25 climbs over the level difference 24 (whether or not the target travel trajectory 25 intersects the level difference 24). When the target travel trajectory 25 climbs over the level difference 24, the level-difference climbing-over angle calculation unit 40 calculates a level-difference climbing-over angle $\theta s$.

The regeneration determination unit 41 determines whether or not the level-difference climbing-over angle $\theta s$ is less than or equal to a predetermined threshold value Th. When the level-difference climbing-over angle $\theta s$ is less than or equal to the predetermined threshold value Th (step S12: Y), the process proceeds to step S13.

In step S13, the target travel trajectory generation unit 38 reduces curvature relaxation parameters of the target travel trajectory, which causes the own vehicle 1 to turn toward the level difference 24.

In step S14, the target travel trajectory generation unit 38, using the curvature relaxation parameters set in step S13, regenerates a target travel trajectory that climbs over the level difference 24. Subsequently, the process returns to step S12.

In contrast, when, in step S12, the level-difference climbing-over angle $\theta s$ is not less than or equal to the predetermined threshold value Th (step S12: N), the target travel trajectory generation unit 38 outputs the target travel trajectory and the target speed profile to the vehicle control unit 42, which finishes the trajectory generation processing, and the process proceeds to step S8 in FIG. 6.

Figure 6:
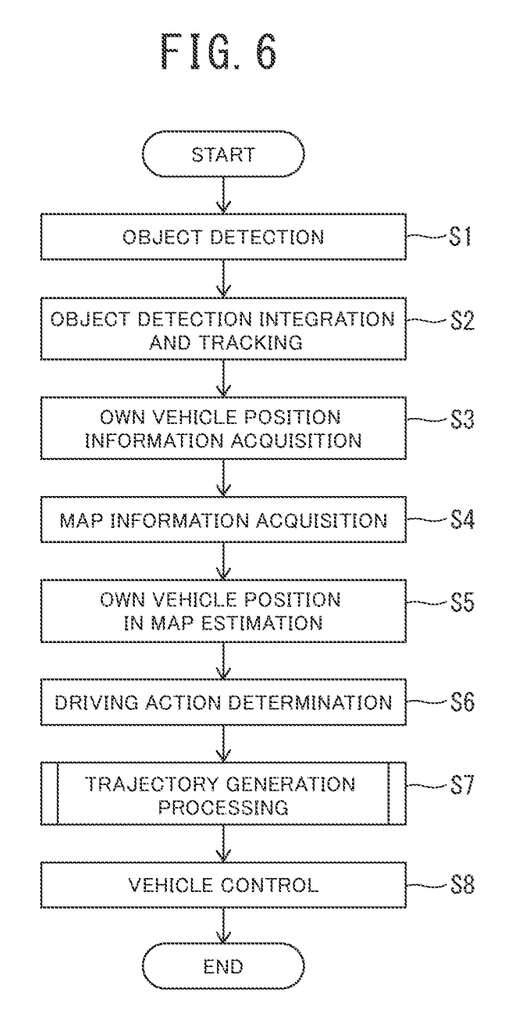
FIG. 6 is a flowchart of an example of the driving assistance method of the embodiments.

FIG. 6 is now referred to. In step S8, the vehicle control unit 42 controls the own vehicle 1 in such a way that the own vehicle 1 travels in accordance with the target travel trajectory and the speed profile generated in step S7.

(Variation)

Although, in the above-described example, whether or not the level-difference climbing-over angle $\theta s$ of a target travel trajectory generated by the target travel trajectory generation unit 38 was less than or equal to the predetermined threshold value Th was determined and, when the level-difference climbing-over angle $\theta s$ was less than or equal to the predetermined threshold value Th, a target travel trajectory was regenerated, the present invention is not limited thereto. When generating a target travel trajectory that climbs over the level difference 24, the target travel trajectory generation unit 38 may generate the target travel trajectory by appropriately setting curvature relaxation parameters in such a way that the level-difference climbing-over angle $\theta s$ is larger than the predetermined threshold value Th. In this case, the level-difference climbing-over angle calculation unit 40 and the regeneration determination unit 41, illustrated in FIG. 3, may be omitted.

For example, the target travel trajectory generation unit 38 may determine, based on the driving action plan generated by the driving action plan determination unit 36 and the level-difference information acquired by the level-difference determination unit 39, whether or not to generate a target travel trajectory that climbs over the level difference 24.

When generating a target travel trajectory that climbs over the level difference 24, the target travel trajectory generation unit 38 may generate a target travel trajectory the level-difference climbing-over angle $\theta s$ of which is larger than the predetermined threshold value Th by appropriately setting smaller curvature relaxation parameters than in the case of generating a target travel trajectory that does not climb over the level difference 24.

Advantageous Effects of First Embodiment (1) The controller 16 controls the own vehicle 1 by a controller in such a way that the own vehicle 1 travels along a target travel trajectory. The level-difference determination unit 39 acquires level-difference information of a level difference 24 that exists in parallel with the lane 20 in which the own vehicle 1 travels. When generating a target travel trajectory that climbs over the level difference 24, the target travel trajectory generation unit 38 generates the target travel trajectory in such a way that a level-difference climbing-over angle $\theta s$ is larger than a predetermined threshold value Th.

Because of this configuration, an angle at which the steered wheels of the own vehicle 1 climb over the level difference 24 becomes small and disturbance becomes small, which enables tracking error with respect to the target travel trajectory to be reduced. Because of this effect, it is possible reduce a possibility of collision with an off-road obstacle.

(2) The target travel trajectory generation unit 38 generates a target travel trajectory depending on a detection result of an object around the own vehicle 1. When the level-difference climbing-over angle $\theta s$ formed by the generated target travel trajectory and a straight line parallel with the level difference 24 is less than or equal to the threshold value Th, the target travel trajectory generation unit 38 regenerates a target travel trajectory in such a way that the level-difference climbing-over angle $\theta s$ is larger than the threshold value Th.

Because of this configuration, an angle at which the steered wheels of the own vehicle 1 climb over the level difference 24 becomes small and disturbance becomes small, which enables tracking error with respect to the target travel trajectory to be reduced. Because of this effect, it is possible reduce a possibility of collision with an off-road obstacle.

(3) The regeneration determination unit 41 may set a larger value as the threshold value Th as the level difference 24 is higher or the inclination of the level difference 24 is larger.

Since the higher the level difference is or the larger the inclination angle is, the larger a resistance force input to the tires from the level difference 24 becomes and the larger the tracking error with respect to the target travel trajectory becomes, setting the threshold value Th larger enables the error to be suppressed.

(4) The regeneration determination unit 41 may set a larger value as the threshold value Th as the aspect ratio of the tires of the own vehicle 1 is lower or the outer diameter of the tires is smaller.

Since how likely the steered wheels are to be influenced by disturbance is determined in such a manner that the lower the aspect ratio of the tires is and the smaller the outer diameter of the tires is, the larger the tracking error with respect to a target travel trajectory becomes, setting the threshold value Th larger enables the error to be suppressed.

(5) The regeneration determination unit 41 may acquire obstacle information of obstacles around the own vehicle 1 and, when an obstacle exists in the vicinity of a target travel trajectory along which the own vehicle 1, after climbing over the level difference 24, is to travel, set a larger value as the threshold value Th.

When there is an obstacle at a position close to the target travel trajectory after climbing over the level difference 24, setting the threshold value Th larger enables the error to be suppressed and a collision to be avoided.

(6) The regeneration determination unit 41 may set a larger value as the threshold value Th as lane width of a lane in which the own vehicle 1, after climbing over the level difference 24, is to travel is narrower.

When the travelling path width after climbing over the level difference 24 is narrow, setting the threshold value Th larger enables the error to be suppressed and the own vehicle 1 to be prevented from departing from the travelling path to the outside and colliding with an obstacle.

(7) The target travel trajectory generation unit 38 may set target vehicle speed at a point of time when the own vehicle 1 passes the level difference 24 to a low speed.

Lowering the vehicle speed enables trajectory correction after climbing over the level difference 24 to be promptly performed, a large error to be prevented from continuing, and follow-up performance to the target travel trajectory to be improved.

(8) The target travel trajectory generation unit 38 may set lower the target speed at a point of time when the own vehicle 1 passes the level difference 24 as the level difference 24 is higher or the inclination of the level difference 24 is larger.

Since the higher the level difference 24 is or the larger the inclination thereof is, the larger the amount of deviation after climbing over the level difference 24 becomes, lowering the vehicle speed enables trajectory correction after climbing over the level difference 24 to be promptly performed, a large error to be prevented from continuing, and follow-up performance to the target travel trajectory to be improved.

(9) The target travel trajectory generation unit 38 may set lower the target speed at a point of time when the own vehicle 1 passes the level difference 24 as the aspect ratio of the tires of the own vehicle 1 is lower or the outer diameter of the tires is smaller.

Since the smaller the aspect ratio of the tires is or the smaller the outer diameter of the tires is, the larger the amount of deviation after climbing over the level difference 24 becomes, lowering the vehicle speed enables trajectory correction after climbing over the level difference 24 to be promptly performed, a large error to be prevented from continuing, and follow-up performance to the target travel trajectory to be improved.

(10) The target travel trajectory generation unit 38 may acquire obstacle information of obstacles around the own vehicle 1 and, when an obstacle exists in the vicinity of a target travel trajectory along which the own vehicle 1, after climbing over the level difference 24, is to travel, set lower the target speed at a point of time when the own vehicle 1 passes the level difference 24.

Since, when there is an obstacle after climbing over the level difference 24, a collision risk after climb-over increases, lowering the vehicle speed enables trajectory correction after climbing over the level difference 24 to be promptly performed, a large error to be prevented from continuing, and a collision to be avoided.

(11) The target travel trajectory generation unit 38 may set lower the target speed at a point of time when the own vehicle 1 passes the level difference 24 as the lane width of a lane in which the own vehicle 1, after climbing over the level difference 24, is to travel is narrower.

Since the narrower the lane width is, the higher an off-road departure risk after climbing over the level difference 24 becomes, lowering the vehicle speed enables trajectory correction after climbing over the level difference 24 to be promptly performed, a large error to be prevented from continuing, and a collision to be avoided.

(12) The target travel trajectory generation unit 38 may set lower the target vehicle speed at a point of time when the own vehicle 1 passes the level difference 24 as the level-difference climbing-over angle θs is smaller.

Even when the level-difference climbing-over angle θs is small, lowering the vehicle speed enables correction of a route to be promptly performed, a large error to be prevented from continuing, and a collision to be avoided.

(13) The level-difference climbing-over angle calculation unit 40 may calculate, using a trajectory that the center position of the axle of the steered wheels of the own vehicle 1 passes as a target travel trajectory, a level-difference climbing-over angle θs formed by a straight line parallel with the level difference 24 and the target travel trajectory.

Taking into consideration a trajectory of the center position of the axle of the steered wheels instead of the vehicle body center enables exactitude of a tire angle at the time of the steered wheels climbing over the level difference 24 to be improved.

Second Embodiment

Next, a second embodiment will be described. How close a level-difference climbing-over angle θs can be brought to 90 degrees depends on a traveling situation, a surrounding environment, and the like of an own vehicle 1. That is, an allowable range of curvature relaxation parameters within which the curvature relaxation parameters can be adjusted to bring the level-difference climbing-over angle θs close to 90 degrees depends on a traveling situation, a surrounding environment, and the like of the own vehicle 1. Thus, there is a case where a target travel trajectory cannot be generated in such a way that the level-difference climbing-over angle θs is larger than a predetermined threshold value Th.

Figure 8A:
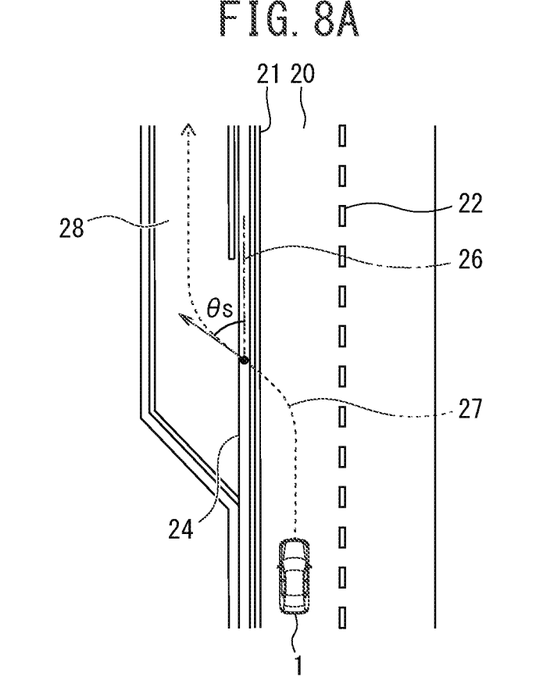
FIG. 8A is an explanatory diagram of an example of a situation in which target speed at a point of time when an own vehicle passes a level difference is set low.

FIG. 8A is now referred to. A case is assumed where a target travel trajectory 27 that, from a lane 20, climbs over a level difference 24 and makes a lane change to a branch lane 28 is generated. In this case, it is necessary to, after making a lane change to the branch lane 28, steer wheels to the opposite side, and, when the level-difference climbing-over angle θs is brought close to 90 degrees, curvature relaxation parameters exceed an allowable range thereof and the own vehicle 1, after climbing over the level difference 24, becomes unable to travel within the travelling path boundaries of the branch lane 28. Thus, the level-difference climbing-over angle θs cannot be brought close to 90 degrees.

Figure 8B:
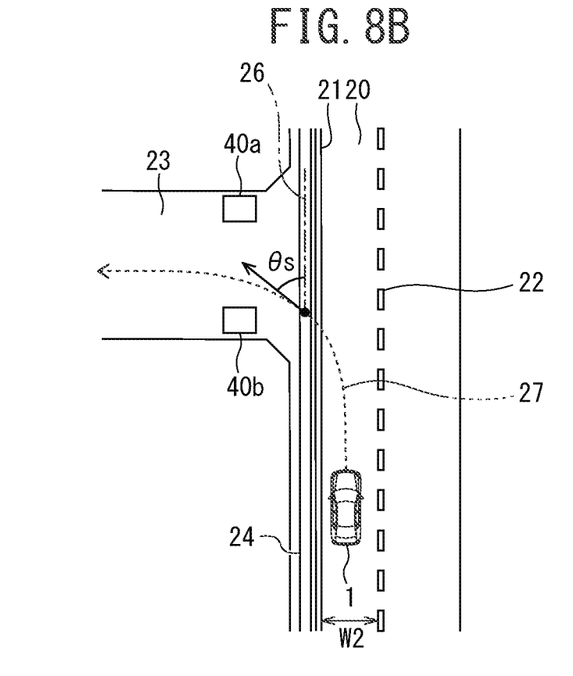
FIG. 8B is an explanatory diagram of another example of the situation in which the target speed at a point of time when the own vehicle passes a level difference is set low.

FIG. 8B is now referred to. In the case where lane width W2 of the lane 20 in which the own vehicle 1 is traveling before climbing over the level difference 24 is narrow, when the level-difference climbing-over angle θs is brought close to 90 degrees, curvature relaxation parameters also exceed the allowable range thereof and the own vehicle 1 becomes unable to travel within the travelling path boundaries of the lane 20 before climbing over the level difference 24. In this case, the level-difference climbing-over angle θs also cannot be brought close to 90 degrees.

Accordingly, a target travel trajectory generation unit 38 of the second embodiment determines whether or not a target travel trajectory can be generated in such a way that the own vehicle 1 travels within the travelling path boundaries and the level-difference climbing-over angle θs is larger than the threshold value Th.

When no target travel trajectory can be generated in such a way that the own vehicle 1 travels within the travelling path boundaries and the level-difference climbing-over angle θs is larger than the threshold value Th, the target travel trajectory generation unit 38 sets a target vehicle speed at a point of time when the own vehicle 1 passes the level difference 24 to a predetermined low speed.

Because of this configuration, even when no target travel trajectory can be generated in such a way that the level-difference climbing-over angle θs is larger than the predetermined threshold value Th, it is possible to suppress the amount of deviation from the target travel trajectory after climbing over the level difference 24 and promptly perform correction after climbing over the level difference 24.

Figure 9:
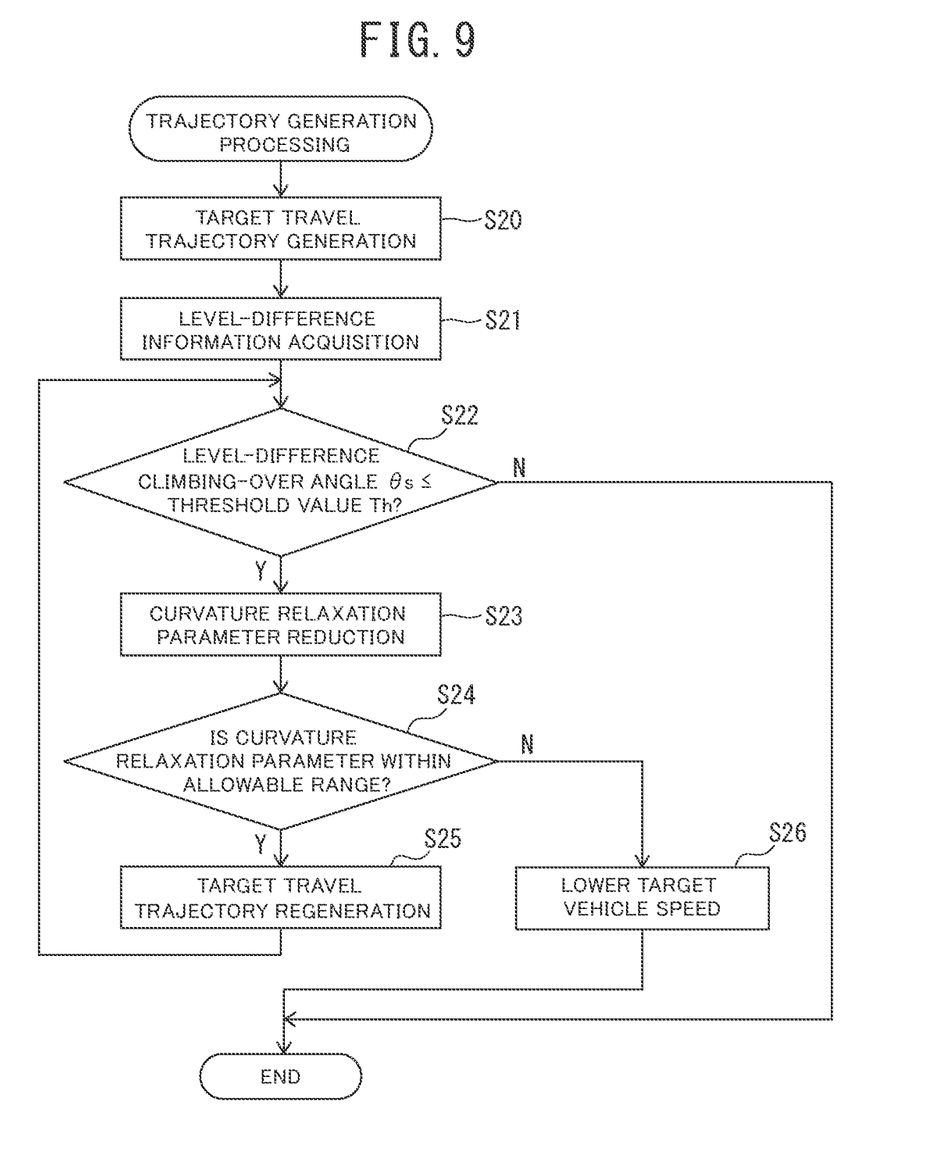
FIG. 9 is a flowchart of an example of trajectory generation processing of a second embodiment.

With reference to FIG. 9, trajectory generation processing of the second embodiment will be described. Processing in steps S20 to S23 are the same as the processing in steps S10 to S13 described with reference to FIG. 7.

In step S24, the target travel trajectory generation unit 38 determines whether or not the curvature relaxation parameters reduced in step S23 are within the predetermined allowable range. For example, the target travel trajectory generation unit 38 determines whether or not a target travel trajectory along which the own vehicle 1 travels within the travelling path boundaries can be generated by using the curvature relaxation parameters reduced in step S23.

When the curvature relaxation parameters are not within the predetermined allowable range (step S24: N), the process proceeds to step S26.

In step S26, the target travel trajectory generation unit 38 sets a target speed profile in such a way that target speed at a point of time when the own vehicle 1 passes the level difference 24 becomes lower. For example, the target travel trajectory generation unit 38 sets a target speed profile in such a way that the target speed at a point of time when the own vehicle 1 passes the level difference 24 is a low speed. Subsequently, the trajectory generation processing is finished, and the process proceeds to step S8 in FIG. 6.

When the curvature relaxation parameters are within the predetermined allowable range (step S24: Y), the process proceeds to step S25. Processing in step S25 is the same as the processing in step S14 described with reference to FIG. 7. Subsequently, the process returns to step S22.

Advantageous Effects of Second Embodiment

An object detection unit 30 detects travelling path boundaries of the lane 20 in which the own vehicle 1 travels. When no target travel trajectory can be generated in such a way that the own vehicle 1 travels within the travelling path boundaries and the level-difference climbing-over angle θs is larger than the threshold value Th, the target travel trajectory generation unit 38 sets the target vehicle speed at a point of time when the own vehicle 1 passes the level difference 24 to the low speed.

Because of this configuration, even when no target travel trajectory can be generated in such a way that the level-difference climbing-over angle θs is larger than the predetermined threshold value Th, it is possible to suppress the amount of deviation from the target travel trajectory after climbing over the level difference 24 and promptly perform correction after climbing over the level difference 24.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
2FL, 2FR Steered wheel
2RL, 2RR Wheel3 Axle
10 Driving assistance device
11 Object sensor
12 Vehicle sensor
13 Positioning device14 Map database
15 Communication device
16 Controller
17 Actuator
18 Processor
19 Storage device
30 Object detection unit
31 Own-vehicle position estimation unit
32 Map acquisition unit
33 Detection integration unit
34 Object tracking unit
35 Position-in-map calculation unit
36 Driving action plan determination unit
37 Travelable region determination unit
38 Target travel trajectory generation unit
39 Level-difference determination unit
40 Level-difference climbing-over angle calculation unit
41 Regeneration determination unit
42 Vehicle control unit

The invention claimed is:

1. A driving assistance method for controlling an own vehicle by a controller in such a way that the own vehicle travels along a target travel trajectory, the method comprising:
acquiring level-difference information of a level difference existing along a lane in which the own vehicle travels; and
when, from the level-difference information, determining that the own vehicle is to climb over the level difference, generating the target travel trajectory in such a way that a level-difference climbing-over angle, which is an angle formed by the level difference and the target travel trajectory, is larger than a threshold value, wherein a larger value is set as the threshold value as the level difference is higher or inclination of the level difference is larger.

2. The driving assistance method according to claim 1, further comprising:

generating the target travel trajectory depending on a detection result of an object around the own vehicle; and in a case of acquiring level-difference information of the level difference existing along a lane in which the own vehicle travels and, from the level-difference information, determining that the own vehicle is to climb over the level difference, when the level-difference climbing-over angle formed by the generated target travel trajectory and the level difference is less than or equal to the threshold value, regenerating or correcting the target travel trajectory in such a way that the level-difference climbing-over angle is larger than the threshold value.

3. The driving assistance method according to claim 1, further comprising setting a larger value as the threshold value as an aspect ratio of tires of the own vehicle is lower or outer diameter of the tires is smaller.

4. The driving assistance method according to claim 1, further comprising:

acquiring obstacle information of an obstacle around the own vehicle; and wherein, when there is an obstacle in a vicinity of the target travel trajectory along which the own vehicle, after climbing over the level difference, is to travel, setting a larger value as the threshold value.

5. The driving assistance method according to claim 1, further comprising setting a target vehicle speed at a point of time when the own vehicle passes the level difference to a low speed.

6. The driving assistance method according to claim 1, further comprising setting a lower target speed at a point of time when the own vehicle passes the level difference as the level difference is higher or inclination of the level difference is larger.

7. The driving assistance method according to claim 1, further comprising setting a lower target speed at a point of time when the own vehicle passes the level difference as an aspect ratio of tires of the own vehicle is lower or outer diameter of the tires is smaller.

8. The driving assistance method according to claim 1, further comprising:

acquiring obstacle information of an obstacle around the own vehicle; and wherein, when there is an obstacle in a vicinity of the target travel trajectory along which the own vehicle, after climbing over the level difference, is to travel, setting a lower target speed at a point of time when the own vehicle passes the level difference.

9. The driving assistance method according to claim 1, further comprising setting a lower target speed at a point of time when the own vehicle passes the level difference as lane width of a lane in which the own vehicle, after climbing over the level difference, is to travel is narrower.

10. The driving assistance method according to claim 1, further comprising:

detecting travelling path boundaries of a lane in which the own vehicle travels; and wherein, when the target travel trajectory cannot be generated in such a way that the own vehicle travels within the travelling path boundaries and the level-difference climbing-over angle is larger than the threshold value, setting a target vehicle speed at a point of time when the own vehicle passes the level difference to a low speed.

11. The driving assistance method according to claim 1, further comprising setting a lower target vehicle speed at a point of time when the own vehicle passes the level difference as the level-difference climbing-over angle is smaller.

12. The driving assistance method according to claim 1, further comprises, using a trajectory that a center position of an axle of steered wheels of the own vehicle passes as the target travel trajectory, calculating a level-difference climbing-over angle formed by the level difference and the target travel trajectory.

13. A driving assistance device configured to control an own vehicle in such a way that the own vehicle travels along a target travel trajectory, comprising:

a sensor configured to detect an object around the own vehicle; and a controller configured to acquire level-difference information of a level difference existing along a lane in which the own vehicle travels and when, from the level-difference information, determining that the own vehicle is to climb over the level difference, generate the target travel trajectory in such a way that a level-difference climbing-over angle, which is an angle formed by the level difference and the target travel trajectory, is larger than a threshold value, wherein a larger value is set as the threshold value as the level difference is higher or inclination of the level difference is larger.

* * * * *